US008555184B2

(12) United States Patent
Hong et al.

(10) Patent No.: US 8,555,184 B2
(45) Date of Patent: Oct. 8, 2013

(54) METHOD OF INTERACTING WITH A SCROLLABLE AREA ON A PORTABLE ELECTRONIC DEVICE

(75) Inventors: Yoojin Hong, Redwood City, CA (US); Patryk Adamczyk, Mississauga (CA)

(73) Assignee: Blackberry Limited, Waterloo (CA)

( * ) Notice: Subject to any disclaimer, the term of this patent is extended or adjusted under 35 U.S.C. 154(b) by 192 days.

(21) Appl. No.: 13/052,743

(22) Filed: Mar. 21, 2011

(65) Prior Publication Data
US 2011/0265002 A1    Oct. 27, 2011

Related U.S. Application Data

(60) Provisional application No. 61/326,361, filed on Apr. 21, 2010.

(51) Int. Cl.
G06F 3/01    (2006.01)
G06F 3/041   (2006.01)

(52) U.S. Cl.
USPC ............ 715/768; 715/786; 715/702; 715/863

(58) Field of Classification Search
USPC .................................. 715/702, 786, 863, 768
See application file for complete search history.

(56) References Cited

U.S. PATENT DOCUMENTS

| | | | |
|---|---|---|---|
| 6,057,840 A | 5/2000 | Durrani et al. | |
| 6,069,626 A | 5/2000 | Cline et al. | |
| 7,429,993 B2 * | 9/2008 | Hui | 345/629 |
| 7,479,949 B2 * | 1/2009 | Jobs et al. | 345/173 |
| 7,515,142 B2 * | 4/2009 | Park | 345/173 |
| 7,774,703 B2 * | 8/2010 | Junuzovic et al. | 715/246 |
| 8,010,900 B2 * | 8/2011 | Hart et al. | 715/747 |
| 2002/0057263 A1 * | 5/2002 | Keely et al. | 345/179 |
| 2003/0058281 A1 | 3/2003 | Kepros et al. | |
| 2005/0275633 A1 * | 12/2005 | Varanda | 345/173 |
| 2006/0061550 A1 | 3/2006 | Fateh | |
| 2006/0132457 A1 * | 6/2006 | Rimas-Ribikauskas et al. | 345/173 |
| 2007/0186171 A1 * | 8/2007 | Junuzovic et al. | 715/751 |
| 2008/0062207 A1 * | 3/2008 | Park | 345/684 |
| 2008/0163053 A1 * | 7/2008 | Hwang et al. | 715/702 |
| 2008/0174570 A1 * | 7/2008 | Jobs et al. | 345/173 |
| 2008/0178116 A1 * | 7/2008 | Kim | 715/786 |
| 2008/0195969 A1 * | 8/2008 | Brown et al. | 715/802 |
| 2009/0158191 A1 * | 6/2009 | Varanda | 715/773 |
| 2009/0163250 A1 * | 6/2009 | Park | 455/566 |
| 2011/0063325 A1 * | 3/2011 | Saunders | 345/639 |
| 2011/0099511 A1 * | 4/2011 | Waldeck | 715/786 |

OTHER PUBLICATIONS

International Search Report; PCT/CA2011/050149; Dated May 19, 2011.

* cited by examiner

*Primary Examiner* — Daeho Song
(74) *Attorney, Agent, or Firm* — Novak Druce Connolly Bove + Quigg LLP (57) ABSTRACT

A method of interacting with a scrollable area on a portable electronic device is described. In accordance with one embodiment, there is provided a method of interacting with a portable electronic device having a touch-sensitive display, the method comprising: displaying a user interface screen having a scrollable area on the touch-sensitive display; and displaying a transparent scrollbar which overlays elements of the user interface screen when a touch event is detected in a display area corresponding to the scrollable area.

20 Claims, 7 Drawing Sheets

METHOD OF INTERACTING WITH A SCROLLABLE AREA ON A PORTABLE ELECTRONIC DEVICE

RELATED APPLICATION DATA

The present application claims the benefit and priority of U.S. provisional application No. 61/326,361, filed Apr. 21, 2010, which is incorporated herein by reference.

TECHNICAL FIELD

The present disclosure relates to portable electronic devices, and in particular to a method of interacting with a scrollable area on a portable electronic device.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. Improvements in methods of interacting with a scrollable area on a portable electronic device, such those having a touch-sensitive display, are desirable.

DETAILED DESCRIPTION OF EXAMPLE EMBODIMENTS

In accordance with one embodiment of the present disclosure, there is provided a method of interacting with a portable electronic device having a touch-sensitive display, the method comprising: displaying a user interface screen having a scrollable area on the touch-sensitive display; displaying a transparent scrollbar which overlays elements of the user interface screen when a touch event is detected in a display area corresponding to the scrollable area; and redisplaying the user interface screen without the transparent scrollbar when the touch event ends.

In accordance with another embodiment of the present disclosure, there is provided a method of interacting with a portable electronic device having a touch-sensitive display, the method comprising: displaying a user interface screen having a scrollable area on the touch-sensitive display, the user interface screen having a transparent scrollbar which overlays elements of the scrollable area when a touch event is detected in a display area corresponding to the scrollable area; decreasing a transparency level of the transparent scrollbar from a default level when a touch event is detected in a display area corresponding to the scrollable area; and increasing the transparency level of the transparent scrollbar to the default level when the touch event ends.

In accordance with a further embodiment of the present disclosure, there is provided a portable electronic device, comprising: a processor; a touch-sensitive display having a touch-sensitive overlay coupled to the processor; wherein the processor is configured for: causing the display of a user interface screen having a scrollable area on the touch-sensitive display; causing the display of a transparent scrollbar which overlays elements of the user interface screen when a touch event is detected in a display area corresponding to the scrollable area; and causing the redisplay of the user interface screen without the transparent scrollbar when the touch event ends.

In accordance with yet a further embodiment of the present disclosure, there is provided a portable electronic device, comprising: a processor; a touch-sensitive display having a touch-sensitive overlay coupled to the processor; wherein the processor is configured for: causing the display of a user interface screen having a scrollable area on the touch-sensitive display, the user interface screen having a transparent scrollbar which overlays elements of the scrollable area when a touch event is detected in a display area corresponding to the scrollable area; causing a transparency level of the transparent scrollbar to be decreased from a default level when a touch event is detected in a display area corresponding to the scrollable area; and causing the transparency level of the transparent scrollbar to be increased to the default level when the touch event ends.

In accordance with yet a further embodiment of the present disclosure, there is provided a portable electronic device, comprising: a processor; a touch-sensitive display having a touch-sensitive overlay coupled to the processor; wherein the portable electronic device, for example via the processor, is configured for performing the method(s) set forth herein.

In accordance with yet a further embodiment of the present disclosure, there is provided a computer program product comprising a computer readable medium having stored thereon computer program instructions for implementing a method on a portable electronic device for controlling its operation, the computer executable instructions comprising instructions for performing the method(s) set forth herein.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, PDAs, wirelessly enabled notebook computers, tablet computing devices, and so forth. The portable electronic device may also be a portable electronic device with or without wireless communication capabilities, such as a handheld electronic game device, digital photograph album, digital camera, or other device.

Figure 1:
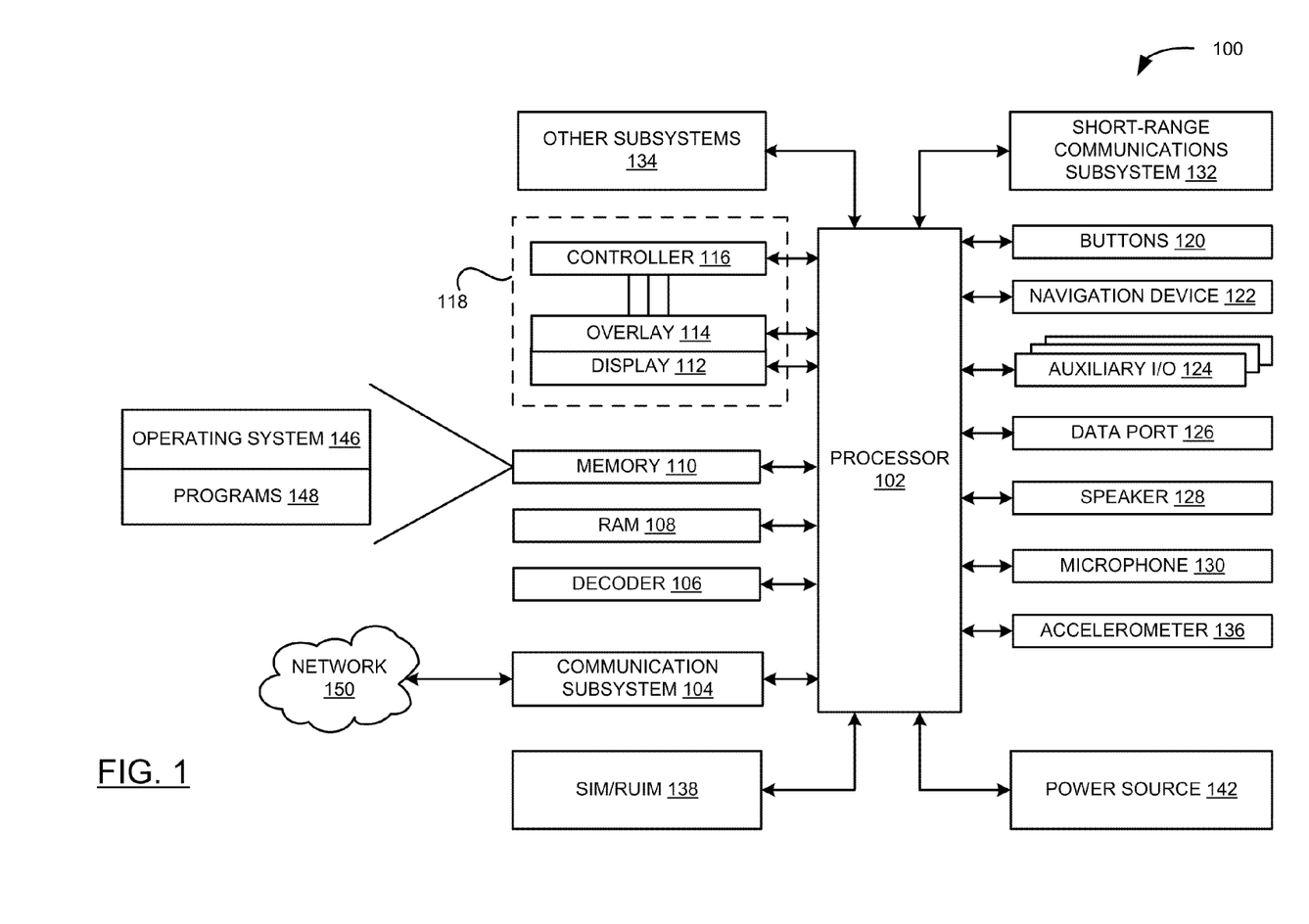
FIG. 1 is a simplified block diagram of components including internal components of a portable electronic device suitable for carrying out the example embodiments of the present disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display screen 112 (such as a liquid crystal display (LCD)) with a touch-sensitive overlay 114 operably coupled to an electronic controller 116 that together comprise a touch-sensitive display 118, one or more keys or buttons 120, a navigation device 122, one or more auxiliary input/output (I/O) subsystems 124, a data port 126, a speaker 128, a microphone 130, short-range communications subsystem 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

Figure 2:
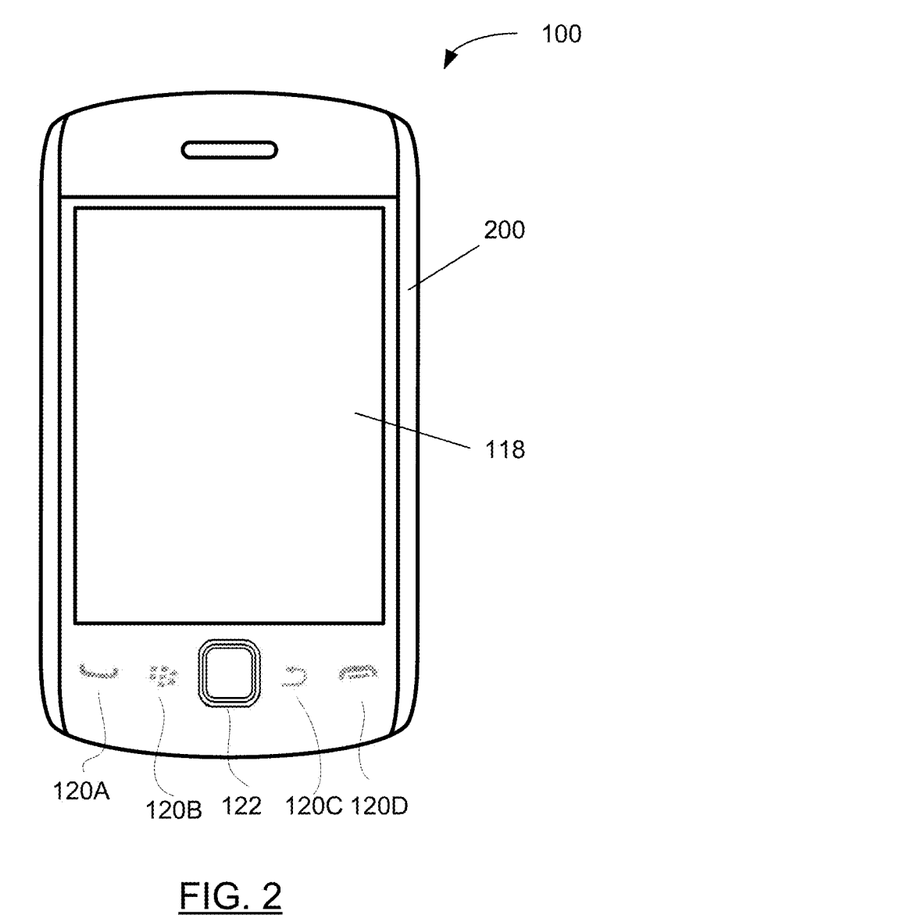
FIG. 2 is a front view of an example of a portable electronic device in a portrait orientation.

The buttons 120, represented individually by references 120A, 120B, 120C and 120D, are located below the touch-sensitive display 118 on a front face of the portable electronic device 100. The buttons 120 generate corresponding input signals when activated. The buttons 120 may be constructed using any suitable button (or key) construction such as, for example, a dome-switch construction. The actions performed by the device 100 in response to activation of respective buttons 120 are context-sensitive. The action performed depends on a context that the button was activated. The context may be, but is not limited to, a device state, application, screen context, selected item or function, or any combination thereof.

The buttons 120, in the shown embodiment, are an answer (or send) button 120A, menu button 120B, escape (or back) button 120C, and a hang up (or end) button 120D. The send/answer button 120A may be used for answering an incoming voice call, invoking a menu for a phone application when there is no voice call in progress, or initiating an outbound voice phone call from the phone application when a phone number is selected in the phone application. The menu button 120B may be used to invoke a context-sensitive menu comprising context-sensitive menu options. The escape/back button 120C may be used to cancel a current action, reverse (e.g., "back up" or "go back") through previous user interface screens or menus displayed on the touch-sensitive display 118, or exit the current application 148. The end/hang up button 120D may be used to end a voice call in progress or hide the current application 148.

The navigation device 122 may be a depressible (or clickable) joystick such as a depressible optical joystick, a depressible trackball, a depressible scroll wheel, or a depressible touch-sensitive trackpad or touchpad. FIG. 2 shows the navigation device 122 in the form of a depressible optical joystick. The auxiliary I/O subsystems 124 may include other input devices such as a keyboard or keypad.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software applications or programs 148 that are executed by the processor 102 and are typically stored in a persistent, updatable storage such as the memory 110. Additional applications or programs 148 may be loaded onto the portable electronic device 100 through the wireless network 150, the auxiliary I/O subsystem 124, the data port 126, the short-range communications subsystem 132, or any other suitable subsystem 134. The operating system 146 provides the GUI which is displayed on display 112. The portable electronic device 100 also includes a renderer which renders graphics, text and other content of the GUI which is displayed on the display 112. The render may be part of the operating system 146 or a separate component which works with the operating system 146.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

Different types of touch events detected by the touch-sensitive display 118, such as touch gestures, are differentiated from each other by the duration of respective touch events. A touch and hold gesture is detected or recognized when a touch event occurs for a duration which is greater than or equal to a threshold duration. The threshold duration may be, for example, 400 milliseconds in some embodiments. Other threshold durations are possible. A tap gesture is detected or recognized when at least one touch event occurs for a duration which is less than the threshold duration.

A one-finger touch and hold gesture occurs when a user touches a selectable onscreen item on the touch-sensitive display 118, such as a button or menu item, with one finger and holds the finger in contact with the touch-sensitive display 118 for a duration which exceeds the threshold duration. A two-finger touch and hold gesture occurs when a user touches a selectable onscreen item on the touch-sensitive display 118 with two-fingers and holds both fingers in contact with the touch-sensitive display 118 for a duration which exceeds the threshold duration. Touching a selectable onscreen item comprises touching a location of the touch-sensitive display 118 which is coincident with the selectable onscreen item displayed on the display screen 112. A location is coincident with the selectable onscreen item in that the centroid of the touch event is within an input area of the user interface screen assigned for receiving input for activating the selectable onscreen item. The input area of the selectable onscreen item may be different than the displayed area of the selectable onscreen item on the display screen 112 in some embodiments, typically the input area being larger than the displayed area in such embodiments to accommodate touch offset of the user.

The result of a tap, one-finger touch and hold gesture, or two-finger touch and hold gesture is context dependent.

The touch-sensitive display 118 is described herein in the context of fingers of a device user for purposes of convenience only. It will be appreciated that a stylus or other object may be used for interacting with the touch-sensitive display 118 depending on the type.

Figure 4A:
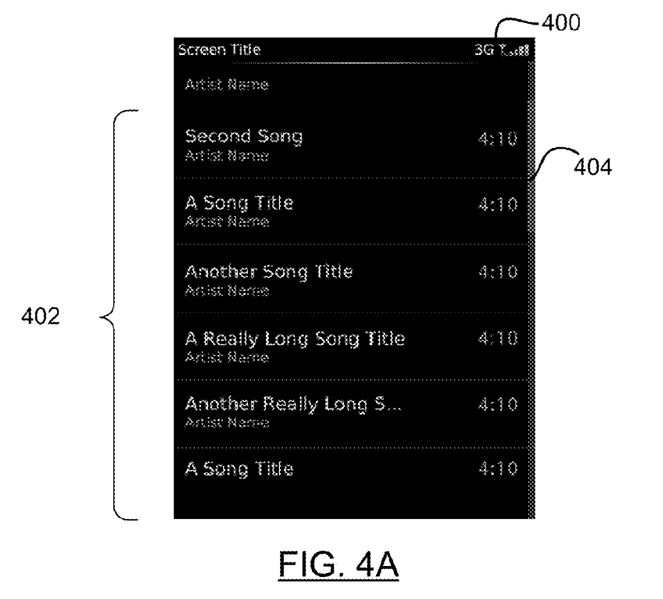
FIGS. 4A to 4E are screenshots of an example user interface screen having a scrollable list of items in various states of activity.
Figure 4B:
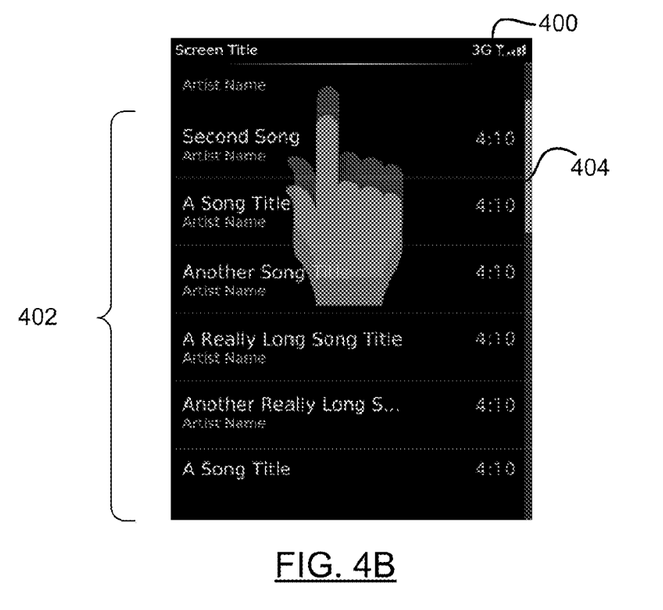
Figure 4C:
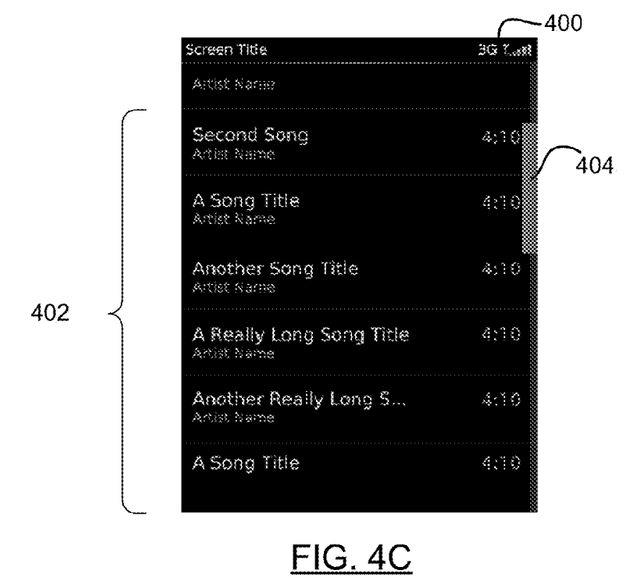
Figure 4D:
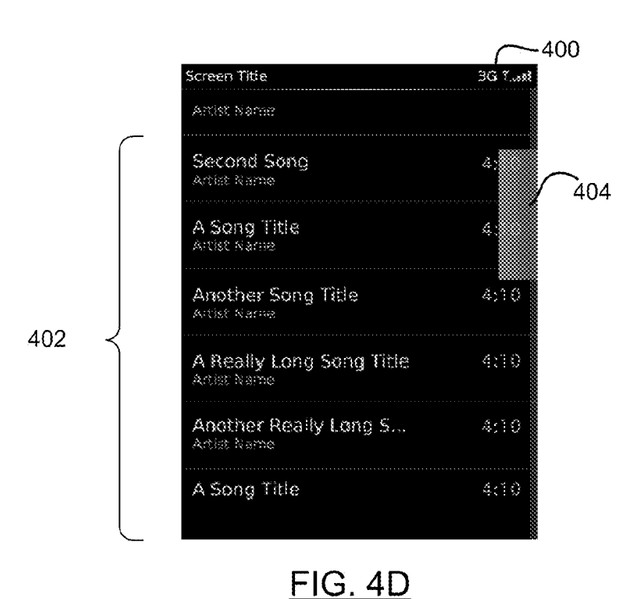
Figure 4E:
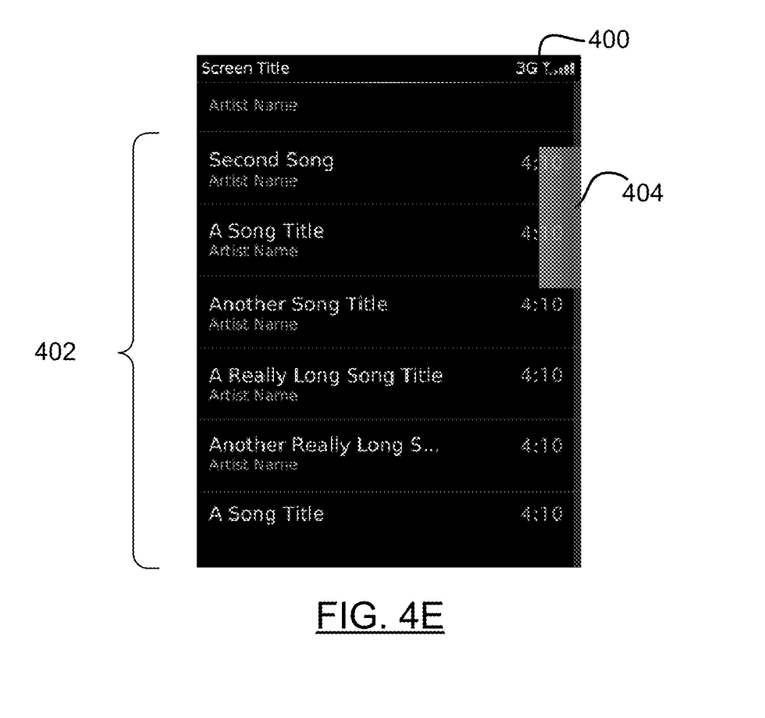

FIGS. 4A to 4E illustrate screenshots of an example user interface screen 400 having a scrollable area in various states of activity. The scrollable area may include a scrollable list 402 of items as in the shown embodiment, but is not limited to scrollable lists. In shown embodiment, the scrollable list 402 is a scrollable list of songs sorted by artist name; however, the scrollable list 402 may be comprised of items of other types or description. In FIG. 4A the portable electronic device 100 is idle in response to a lack of touch input detected by the touch-sensitive display 118. In FIG. 4B, the portable electronic device 100 is active in response to touch input detected by the touch-sensitive display 118. FIGS. 4C to 4E illustrate the example user interface screen 400 in progressive states of interaction via touch input detected by the touch-sensitive display 118.

FIG. 4A shows the example user interface screen 400 when the portable electronic device 100 is an idle state. A transparent scrollbar 404 which overlays elements of the user interface screen 400 is displayed on the display screen 112 which, in at least some embodiments, is part of a touch-sensitive display 118. The transparent scrollbar 404 is transparent so as to allow underlying content of the user interface screen 400 to be displayed and visible to device users including, but not limited to, the scrollable list 402 of items in the user interface screen 400. For example, in the shown embodiment, the transparent scrollbar 404 allows the scrollable list 402 of items to be displayed and visible to device users while providing a visual indication of the interactivity of the scrollable list 402 of items.

In the shown embodiment the transparent scrollbar 404 is located within a display area of the user interface screen 400 which, in the shown embodiment, is displayed at the right-side edge of the touch-sensitive display 118 relative to a screen orientation of the GUI. The display area and transparent scrollbar 404 may be located elsewhere, for example, at the left-side edge of the touch-sensitive display 118, or towards the top or bottom of the touch-sensitive display 118 when the transparent scrollbar 404 and display area extending horizontally across the touch-sensitive display 118 rather than vertically as shown in FIGS. 4A to 4E.

The display area of the transparent scrollbar is transparent in the shown embodiment along with the transparent scrollbar 404. The transparent scrollbar 404 has a transparency level (or colour intensity) which varies with the state of activity of the transparent scrollbar 404. In the idle state shown in FIG. 4A, the transparent scrollbar 404 appears dark-grey in colour and has a transparency level lower than that of the display area extending vertically at the right-side edge of the touch-sensitive display 118. This allows the transparent scrollbar 404 to remain visible with its display area without being distracting to the device user when not in use, e.g. when touch input is not detected on the touch-sensitive display 118. The transparent scrollbar 404 may have a transparency or colour gradient which varies along its length.

The length of transparent scrollbar 404, measured vertically for a vertically extending transparent scrollbar 404 as shown in FIGS. 4A to 4E, or measured horizontally for a horizontally extending transparent scrollbar 404, depends on the size of the scrollable area. The length of transparent scrollbar 404 may be smaller than the scrollable area or larger than the scrollable area, for example, the length of transparent scrollbar 404 may be the full screen area allocated to the scrollable list 402 of items in some embodiments.

FIG. 4B shows the example user interface screen 400 when the portable electronic device 100 is a first active state in response to touch input detected by the touch-sensitive display 118. A graphical representation of a hand is illustrated in FIG. 4B to illustrate the touch input. The hand does not form part of the example user interface screen 400. In the first active state shown in FIG. 4B, the transparent scrollbar 404 appears dark-grey in colour and has a transparency level lower than that in the idle state shown in FIG. 4A, and a transparency level lower than that of the display area extending vertically at the right-side edge of the touch-sensitive display 118. This allows the transparent scrollbar 404 to increase in visibility within the display area.

FIG. 4C shows the example user interface screen 400 in a second active state when the portable electronic device 100 is in the active state for a longer duration than the first active state, e.g. after a touch input having a longer duration is detected by the touch-sensitive display 118. In the second active state shown in FIG. 4C, the transparent scrollbar 404 is wider than in the first active state shown in FIG. 4B, appears grey in colour and has a transparency level lower than that in the first active state shown in FIG. 4B.

The transparency level of the transparent scrollbar 404 in the second active state of FIG. 4C is also lower than transparency level of the transparent scrollbar 404 in the idle state of FIG. 4A and the display area extending vertically at the right-side edge of the touch-sensitive display 118. This allows the transparent scrollbar 404 to increase in visibility within the display area.

FIG. 4D shows the example user interface screen 400 in a third active state when the portable electronic device 100 is in the active state for a longer duration than either the first or second active states, e.g. after a touch input having yet a longer duration is detected by the touch-sensitive display 118. In the third active state shown in FIG. 4D, the transparent scrollbar 404 is wider than in the second active state shown in FIG. 4C, appears grey in colour and has a transparency level lower than that in the second active state shown in FIG. 4C.

The transparency level of the transparent scrollbar 404 in the third active state of FIG. 4D is also lower than the transparency level of the transparent scrollbar 404 in the idle state of FIG. 4A, the first active state of FIG. 4B, and the display area extending vertically at the right-side edge of the touch-sensitive display 118. This allows the transparent scrollbar 404 to increase in visibility within the display area.

FIG. 4E shows the example user interface screen 400 in a fourth active state when the portable electronic device 100 is in the active state for a duration longer than the duration for the first, second or third active states, and which exceeds a threshold duration. The threshold duration, in at least some embodiments, is the threshold duration for a touch and hold event described above (e.g., one-finger touch and hold gesture), which may be 400 milliseconds in some example embodiments. In other words, a touch event occurring for a duration which is greater than or equal to the threshold duration is detected on the touch-sensitive display 118.

In the fourth active state shown in FIG. 4E, the transparent scrollbar 404 is highlighted or focussed with an onscreen position indicator. Highlighting or focusing the transparent scrollbar 404 with the onscreen position indicator causes the appearance of the transparent scrollbar 404 to be changed from a first visual state to a second visual state different from the first visual state. Changing the appearance of the transparent scrollbar 404 in shown embodiment causes the colour of the transparent scrollbar 404 to change from an initial colour (e.g. white or grey) to blue. In the shown embodiment, the transparent scrollbar 404 has the same width and transparency level as in the third active state shown in FIG. 4-D. The transparent scrollbar 404 may be wider, may have a different transparency level than in the third active state shown in FIG. 4C, or both.

FIGS. 4A to 4E illustrate the change in appearance of the transparent scrollbar 404 in response to touch event over time. The transparent scrollbar 404 progressively increases in size (e.g., width) and progressively decreases in transparency (e.g., increasing in colour intensity) over the duration of the touch event, resulting in the transparent scrollbar 404 being highlighted by the onscreen position indicator when a threshold duration is exceeded. In other embodiments, the changes in the appearance of the transparent scrollbar 404 may be limited to one of size or transparency (e.g., colour intensity). When the touch event ends, for example in response to the device user lifting his or her finger from the touch-sensitive display 118, the transparent scrollbar 404 returns to its appearance in the idle state of FIG. 4A.

A user can scroll through the scrollable list 402 of items using touch gestures such as swipe gestures. Swipe gestures have a single direction. Swipe gestures are evaluated by the portable electronic device 100 after the corresponding touch event has ended. The direction of the swipe gesture is evaluated with respect to an initial contact point of the touch event at which the finger makes contact with the touch-sensitive display 118 and a terminal (or ending) contact point at which the finger is lifted from the touch-sensitive display 118. Examples of swipe gestures include a horizontal swipe gesture and vertical swipe gesture. A horizontal swipe gesture typically comprises an initial contact with the touch-sensitive display 118 towards its left or right edge to initialize the gesture, followed by a horizontal movement of the point of contact from the location of the initial contact to the opposite edge while maintaining continuous contact with the touch-sensitive display 118, and a breaking of the contact at the opposite edge of the touch-sensitive display 118 to complete the horizontal swipe gesture. Similarly, a vertical swipe gesture typically comprises an initial contact with the touch-sensitive display 118 towards its top or bottom edge to initialize the gesture, followed by a vertical movement of the point of contact from the location of the initial contact to the opposite edge while maintaining continuous contact with the touch-sensitive display 118, and a breaking of the contact at the opposite edge of the touch-sensitive display 118 to complete the vertical swipe gesture.

Swipe gestures may be of various lengths, may be initiated in various places within the variable repeat control mode area on the touch-sensitive display 118, and need not span the full dimension of the touch-sensitive display 118. In addition, breaking contact of a swipe may be gradual, in that contact pressure on the touch-sensitive display 118 is gradually reduced while the swipe gesture is still underway.

Alternatively, a user can scroll through the scrollable list 402 of items using directional inputs detected by the navigation device 122, e.g. depressible optical joystick. The directional inputs may be caused by movements of the user's finger which are detected by the navigation device 122, or rotational movements of the navigation device 122 caused by the user's finger depending on the type of navigation device 122. When the navigation device 122 is a depressible optical joystick, movements of the user's finger, such as vertical and horizontal movements, are detected by an optical sensor of the optical joystick. Up, down, left or right movements detected by the optical joystick are interpreted as corresponding up, down, left or right navigation commands and the scrollable list 402 of items is scrolled in a respective direction, often only upwards scrolling and downwards scrolling through the scrollable list 402 of items is supported. Typically, navigation via the optical joystick is by 1:1 movement so that each directional gesture or movement detected by the optical joystick cause a corresponding scrolling movement through the scrollable list 402 of items.

Selecting the highlighted transparent scrollbar 404 may cause an action associated with the highlighted transparent scrollbar 404, or an action associated with an item in the scrollable list 402 of items underneath the highlighted transparent scrollbar 404, or both, to be performed. The highlighted transparent scrollbar 404 may be selected by a two-finger touch and hold gesture at the location of the highlighted transparent scrollbar 404, or depressing the navigation device 122, e.g. depressible optical joystick.

Figure 3A:
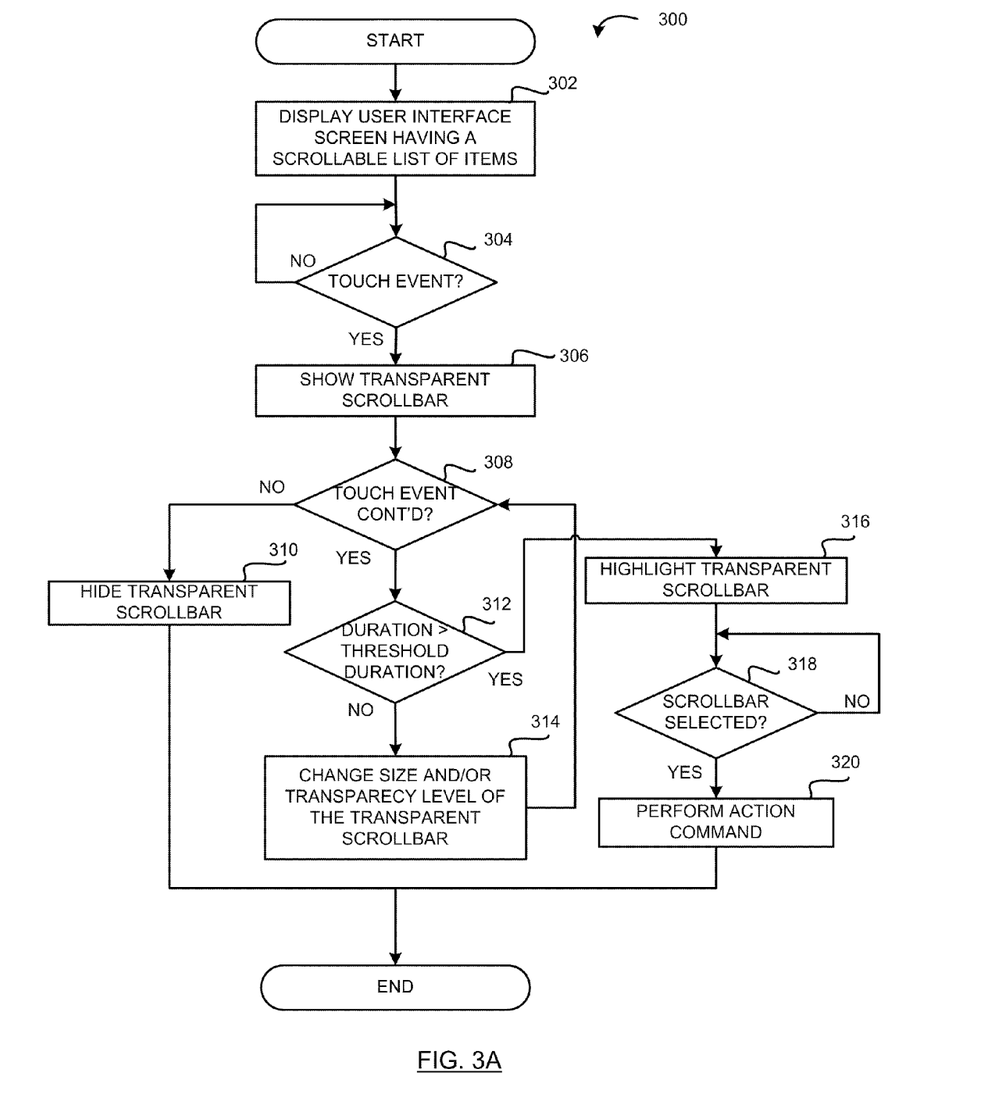
FIG. 3A is a flowchart illustrating an example method of interacting with a portable electronic device in accordance with one example embodiment of the present disclosure.

A flowchart illustrating an example embodiment of a method 300 of interacting with a portable electronic device is shown in FIG. 3A. The method 300 may be carried out by software executed, for example, by the processor 102. Coding of software for carrying out such a method 300 is within the scope of a person of ordinary skill in the art given the present disclosure. The method 300 may contain additional or fewer processes than shown and/or described, and may be performed in a different order. Computer-readable code executable by at least one processor 102 of the portable electronic device 100 to perform the method 300 may be stored in a computer-readable medium such as the memory 110.

In a first step 302, the portable electronic device 100 displays a user interface screen having a scrollable list 402 of items on the touch-sensitive display 118. The user interface screen 400 may be any user interface screen and the items in the scrollable list 402 of items may be any selectable onscreen item having one or more associated action commands.

Next, in step 304 the portable electronic device 100 monitors for and detects touch events on the touch-sensitive display 118. When a touch event is detected within a display area of the scrollable list 402 of items, a transparent scrollbar 404 which overlays elements of the user interface screen 400 is shown in the display area corresponding to the scrollable list 402 of items (step 306). The transparent scrollbar 404 is displayed adjacent to a location of the touch event. The location of the touch event is the centroid of the touch event. The transparent scrollbar 404 is typically displayed at the right-side edge of the touch-sensitive display 118 relative to a screen orientation of the GUI so that it overlays at least part of the scrollable list of items as show in FIGS. 4A to 4E; however, the transparent scrollbar 404 may be located elsewhere in other embodiments.

In some embodiments, showing the transparent scrollbar 404 may comprise decreasing a transparency level of the transparent scrollbar 404 from a default level of the idle state. For example, showing the transparent scrollbar 404 may comprise decreasing the transparency level from that shown in FIG. 4A to that shown in the first active state of FIG. 4B, described above. This allows the transparent scrollbar 404 to increase in visibility within the display area. Alternatively, the transparent scrollbar 404 may be hidden and not displayed in the idle state in which case showing the transparent scrollbar 404 comprises displaying the transparent scrollbar 404 so as to overlay elements of the user interface screen 400 in the display area corresponding to the scrollable list 402 of items.

Next, in step 308 the portable electronic device 100 determines whether the touch event is still in progress. When the touch event is no longer in progress, e.g. when the touch event has ended by the user lifting his or her finger from the touch-sensitive display 118, the transparent scrollbar 404 is hidden (step 310). Hiding the transparent scrollbar 404 may comprise increasing the transparency level of the transparent scrollbar 404 to the default level of the idle state when the touch event ends. For example, hiding the transparent scrollbar 404 may comprise increasing the transparency level from that shown in any of FIGS. 4B to 4E to that shown in the idle state of FIG. 4A, described above. This allows the transparent scrollbar 404 to decrease in visibility within the display area. Alternatively, the transparent scrollbar 404 may be hidden and not displayed in the idle state in which case hiding the transparent scrollbar 404 comprises removing the transparent scrollbar 404 entirely from the user interface screen 400. This may require redisplaying the user interface screen 400 without the transparent scrollbar when the touch event ends. In some embodiments, only the elements of the user interface screen 400 which were overlaid by the transparent scrollbar 404 are redisplayed.

When the touch event remains in progress, the portable electronic device 100 determines whether the touch event has been in progress for a duration which is greater than or equal to a threshold duration (decision block 312). The threshold duration, in at least some embodiments, is the threshold duration for a touch and hold event described above (e.g., one-finger touch and hold gesture), which may be 400 milliseconds in some example embodiments.

When the touch event has been in progress for a duration which is less than the threshold duration, processing proceeds to step 314 in which the appearance of the transparent scrollbar 404 is changed. In at least some embodiments, the appearance of the transparent scrollbar 404 progressively changes based on the duration of the touch event. The appearance of the transparent scrollbar 404 may be changed in size, transparency level, or both. The appearance of the transparent scrollbar 404 may progressively change as shown in FIGS. 4B to 4D.

When the touch event has been in progress for a duration which is greater than or equal to the threshold duration, processing proceeds to step 316 in which the transparent scrollbar 404 is highlighted, for example, as shown in FIG. 4E and described above. Highlighting comprises changing an appearance of the transparent scrollbar from a first visual state to a second visual state different from the first visual state, for example, highlighting may comprise changing a colour of the transparent scrollbar from a first colour (e.g., white or grey) to a second colour (e.g., blue) as described above.

Next, in step 318 the portable electronic device 100 monitors for and detects selection input selecting the highlighted transparent scrollbar 404. The selection input may be, for example, depression of the navigation device 122 when the navigation device 122 is depressible (or clickable) joystick such as a depressible optical joystick, a depressible trackball, a depressible scroll wheel, or a depressible touch-sensitive trackpad or touchpad. Other suitable selection input may be used to select the highlighted transparent scrollbar 404.

When the highlighted transparent scrollbar 404 is selected, processing proceeds to step 320 in which an action associated with the highlighted transparent scrollbar 404, an action associated with an item in the scrollable list 402 of items underneath the highlighted transparent scrollbar 404, or both, is performed. The action is context-sensitive. For example, when the item is a song in a scrollable song list (e.g., a playlist of media player application), selection causes the associated song to be played. When the item is an email message item in a scrollable email message list (e.g., an inbox of an email messaging application), selection causes the associated email message to be displayed on the touch-sensitive display 118.

Figure 3B:
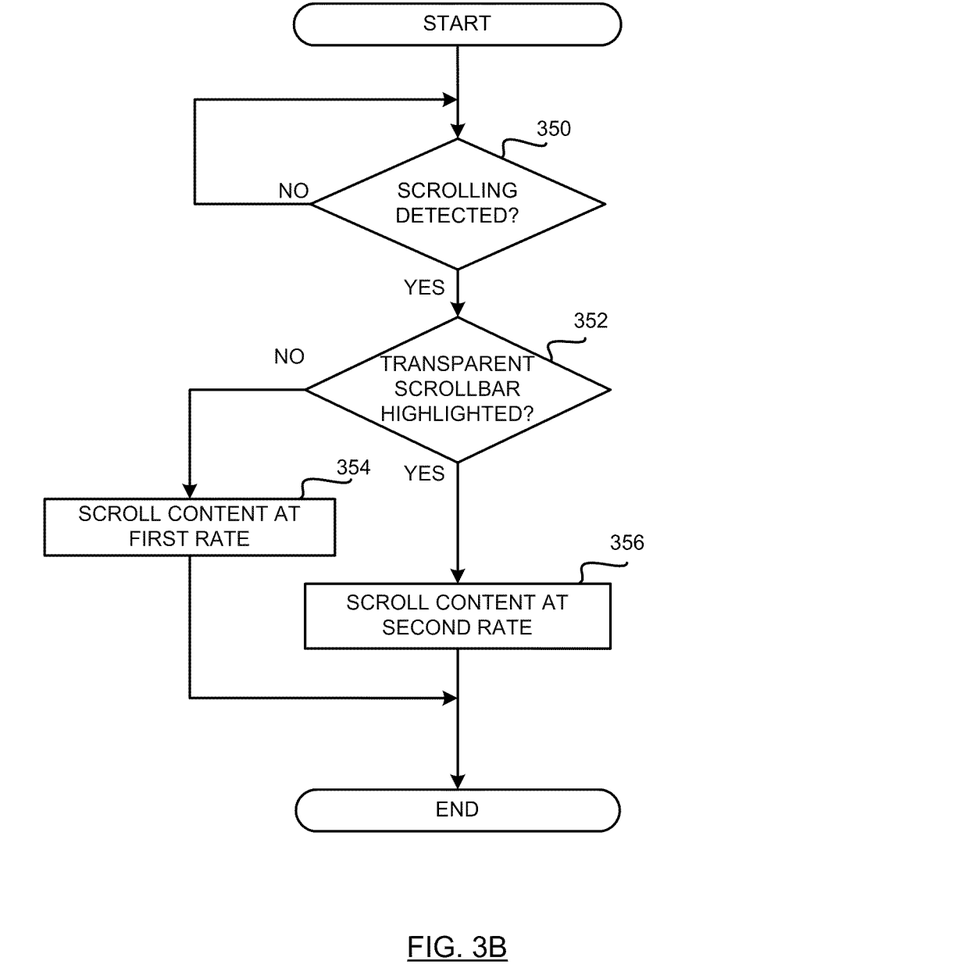
FIG. 3B is a flowchart illustrating an example method of scrolling with a portable electronic device in accordance with one example embodiment of the present disclosure.

Referring now to FIG. 3B, scrolling operation will be described. Throughout the duration of the touch event, the portable electronic device 100 monitors for and detects movement of the touch event (e.g., measured by the movement of a centroid of the touch event) both when the transparent scrollbar 404 is not highlighted and when the transparent scrollbar 404 is highlighted (350). The movement of the touch event may be caused by a swipe gesture or free movement. The highlighting status of the transparent scrollbar 404 is used to determine scrolling operation (352).

When the transparent scrollbar 404 is not highlighted, detection of movement of the touch event causes the content of the scrollable area, e.g. the scrollable list 402 of items, to be scrolled at a first rate (354). The content is scrolled in a direction of the movement relative to a screen orientation of the GUI when scrolling in that direction is possible.

The scrollable area is typically only scrollable in a particular direction when additional content is available in that direction, unless wrapping of the scrollable area is provided. When the scrollable area is at a top of the scrollable content, upward scrolling is not possible because no additional content is available in that direction. When the scrollable area is at a bottom of the scrollable content, downward scrolling is not possible because no additional content is available in that direction. When leftward or rightward scrolling is supported by the scrollable area, leftward and rightward scrolling are restricted by the availability of additional content in those directions.

The scrollable area is scrolled may be scrolled by a fixed amount, or by an amount proportional to the movement of the touch event from a previous location. Typically, the scrollable area is scrolled by an amount equal to the movement of the touch event (e.g., measured by the movement of a centroid of the touch event) so that the ratio of scrolling relative to the movement of the centroid of the touch event is 1:1. A different scrolling ratio may be used, for example, to amplify the effect of movement on scrolling. Alternatively, the speed of the movement of the centroid of the touch event may control the amount of scrolling rather than the movement (e.g., travel distance) of the touch event.

When the transparent scrollbar 404 is highlighted, detection of movement of the touch event (e.g., measured by the movement of a centroid of the touch event) causes the content of the scrollable area, e.g. the scrollable list 402 of items, to be scrolled at a second rate (356). The content is scrolled in a direction of the movement relative to the screen orientation of the GUI similar to when the transparent scrollbar 404 is not highlighted as described above. The movement of the touch event may be caused by a swipe gesture or free movement.

The second rate of scrolling, which occurs when the transparent scrollbar 404 is highlighted, is greater than the first rate of scrolling when the transparent scrollbar 404 is not highlighted. Thus, the rate of scrolling is increased when the transparent scrollbar 404 is highlighted compared to when the transparent scrollbar 404 is not highlighted. For convenience, scrolling when the transparent scrollbar 404 is not highlighted is referred to as normal scrolling whereas scrolling when the transparent scrollbar 404 is highlighted is accelerated scrolling.

When the transparent scrollbar 404 is highlighted, the amount of scrolling may depend on a length of the scrollable area displayed on the display screen 112, which may be part of a touch-sensitive display 118, and the travel distance of the centroid of the touch event. The amount of scrolling may be proportional to a ratio of the travel distance of the centroid of the touch event to a length of the scrollable area displayed on the display screen 112. The amount of scrolling may be equal to a proportional amount of content represented by the ratio. For example, if the travel distance of the centroid of the touch event is 10 pixels and the length of the scrollable area displayed on the display screen 112 is 100 pixels (i.e., a ratio of 1:10 or 10%), the scrollable area may be scrolled in the direction of the movement by amount equal to 10% of the content of the scrollable area. If the total content of the scrollable area is 1200 pixels in length, the amount of scrolling would be 120 pixels (i.e., 10% of 1200 pixels). In other words, the scrollable area scrolls through 10% of the content of the scrollable area in the direction of movement. Alternatively, rather than scrolling through the content of the scrollable area, the scrollable area may jump to a location in the content which is represented by the ratio. For example, the scrollable area may jump to a location in the content which is 120 pixels from a current location in the direction of movement. Other control schemes for increased scrolling rates when the transparent scrollbar 404 is highlighted may be used. For example, the speed of the movement of the centroid of the touch event may control the amount of scrolling rather than the movement (e.g., travel distance) of the touch event.

In other embodiments, the content of the scrollable area may jump in a direction indicated by the movement of the touch event (350) rather than scrolling. The content of the scrollable area may jump forwards or backwards by a fixed or proportional amount as described above. This may be more efficient than scrolling in terms of graphical processing. A scrolling effect may be provided as a transition when jumping between the currently displayed content and the content to be displayed.

In an alternative embodiment, rather than using the touch-sensitive display 118, the transparent scrollbar 404 may be highlighted by moving an onscreen position indicator (not shown) through onscreen items to highlight or focus the transparent scrollbar 404 in accordance with directional inputs detected by the navigation device 122, e.g. depressible optical joystick. The directional inputs may be caused by movements of the user's finger which are detected by the navigation device 122, or rotational movements of the navigation device 122 caused by the user's finger depending on the type of navigation device 122.

When the navigation device 122 is a depressible optical joystick, movements of the user's finger, such as vertical and horizontal movements, are detected by an optical sensor of the optical joystick. Up, down, left or right movements detected by the optical joystick are interpreted as corresponding up, down, left or right navigation commands and the visual indicator is moved from its initial location to a new location focusing a different onscreen item in the displayed user interface screen. Typically, navigation via the optical joystick is by 1:1 movement so that each direction gesture or movement detected by the optical joystick cause a corresponding navigation movement of the visual indicator in the displayed user interface screen. Alternatively, a designated button or key, a predetermined button or key, or other input may be used to highlight the transparent scrollbar 404.

Normal scrolling in the scrollable area when the transparent scrollbar 404 is not highlighted may be performed by directional gestures or movements detected by the optical joystick which causes corresponding scrolling movement through the scrollable area, e.g. scrollable list 402 of items, as described above. A designated button or key, such as a designated one of the buttons 120, may be used as control input to prevent directional gestures/movements detected by the navigation device 122 from moving from the transparent scrollbar 404 to highlight or focus another selectable onscreen item during normal scrolling or accelerated scrolling. Activation (e.g., by depression) of the designated button or key generates a control signal which holds the focus on the transparent scrollbar 404 during scrolling with the navigation device 122, either normal scrolling or accelerated scrolling.

Accelerated scrolling in the scrollable area when the transparent scrollbar 404 is highlighted may be performed by directional gestures or movements detected by the optical joystick which causes corresponding scrolling movement through the scrollable area, e.g. scrollable list 402 of items, as described above. However, the amount of scrolling may be proportional to a ratio of the length/distance of the directional gestures or movements detected by the optical joystick to a length of the scrollable area displayed on the display screen 112 rather than a ratio of the travel distance of the centroid of the touch event to a length of the scrollable area. The amount of scrolling may be equal to a proportional amount of content represented by the ratio as described above.

In yet other alternative embodiments, normal scrolling and accelerated scrolling with the navigation device 122, or possibly even the touch-sensitive display 118, may be supported without the visual indication provided by highlighting the transparent scrollbar 404, possibly without changing the transparency of the transparent scrollbar 404, possibly having a permanent scrollbar which is not transparent, or possibly without the transparent scrollbar 404 entirely.

The method of interacting with a scrollable area on a portable electronic device described herein may also be extended to portable electronic device which do not have a touch-sensitive display 118. In such embodiments, the scrollable area is displayed on the display screen 112 in the same manner as described above. The transparent scrollbar 404 may be shown and hidden using a designated button or key, a predetermined button or key, or other suitable input. The transparent scrollbar 404 may be highlighted by moving an onscreen position indicator (not shown) through onscreen items to highlight or focus the transparent scrollbar 404 in accordance with directional inputs detected by the navigation device 122, e.g. depressible optical joystick, as described above.

While the present disclosure is described primarily in terms of methods, the present disclosure is also directed to a portable electronic device configured to perform at least part of the methods. The portable electronic device may be configured using hardware modules, software modules, a combination of hardware and software modules, or any other suitable manner. The present disclosure is also directed to a pre-recorded storage device or computer-readable medium having computer-readable code stored thereon, the computer-readable code being executable by at least one processor of the portable electronic device for performing at least parts of the described methods.

The present disclosure may be embodied in other specific forms without departing from its spirit or essential characteristics. The described embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method of interacting with a portable electronic device having a touch-sensitive display, the method comprising:
displaying a user interface screen having a scrollable area on the touch-sensitive display;
displaying a transparent scrollbar which overlays elements of the user interface screen when a touch event is detected in a display area corresponding to the scrollable area;
determining a duration of the touch event;
decreasing a transparency level of the transparent scrollbar when the duration of the touch event is less than a threshold duration of a touch and hold gesture;
highlighting the transparent scrollbar when the duration of the touch event is greater than or equal to the threshold duration of the touch and hold gesture; and
redisplaying the user interface screen without the transparent scrollbar when the touch event ends.

2. The method of claim 1, wherein the transparent scrollbar overlays at least part of the scrollable area.

3. The method of claim 1, wherein only the elements of the user interface screen which are overlaid by the transparent scrollbar are redisplayed when the touch event ends.

4. The method of claim 1, wherein displaying the transparent scrollbar comprises decreasing the transparency level of the transparent scrollbar from a default level when the touch event is detected in the display area corresponding to the scrollable area, and wherein redisplaying the user interface screen comprises increasing the transparency level of the transparent scrollbar to the default level when the touch event ends.

5. The method of claim 1, wherein the transparent scrollbar is displayed adjacent to a location of the touch event.

6. The method of claim 1, further comprising:
increasing a width of the transparent scrollbar over the duration of the touch event when the duration is less than the threshold duration.

7. The method of claim 1, further comprising:
increasing the transparency level of the transparent scrollbar to the default level when the touch event ends.

8. The method of claim 1, wherein the transparent scrollbar is highlighted with an onscreen position indicator.

9. The method of claim 1, wherein the highlighting comprises changing a colour of the transparent scrollbar from a first colour to a second colour.

10. The method of claim 1, wherein the highlighting comprises changing an appearance of the transparent scrollbar from a first visual state to a second visual state different from the first visual state.

11. The method of claim 1, further comprising:
performing an action associated with the transparent scrollbar when selection input is detected when the transparent scrollbar is highlighted.

12. The method of claim 11, wherein the action is context-sensitive in dependence on the scrollable list, an item in the scrollable list underneath the highlighted transparent scrollbar, or both.

13. The method of claim 1, further comprising:
scrolling content of the scrollable area at a first rate when the transparent scrollbar is not highlighted; and
scrolling content of the scrollable area at a second rate when the transparent scrollbar is highlighted.

14. The method of claim 13, wherein the second rate is greater than the first rate.

15. The method of claim 1, wherein the threshold duration is 400 milliseconds.

16. A method of interacting with a portable electronic device having a touch-sensitive display, the method comprising:
displaying a user interface screen having a scrollable area on the touch-sensitive display, the user interface screen having a transparent scrollbar which overlays elements of the scrollable area when a touch event is detected in a display area corresponding to the scrollable area;
detecting a touch event in a display area corresponding to the scrollable area;
determining a duration of the touch event;

decreasing a transparency level of the transparent scrollbar from a default level when the duration of the touch event is less than a threshold duration of a touch and hold gesture;

highlighting the transparent scrollbar when the duration of the touch event is greater than or equal to the threshold duration of the touch and hold gesture; and increasing the transparency level of the transparent scrollbar to the default level when the touch event ends.

17. A portable electronic device, comprising:

a processor;

a touch-sensitive display having a touch-sensitive overlay coupled to the processor;

wherein the processor is configured for:

causing the display of a user interface screen having a scrollable area on the touch-sensitive display;

causing the display of a transparent scrollbar which overlays elements of the user interface screen when a touch event is detected in a display area corresponding to the scrollable area;

determining a duration of the touch event;

decreasing a transparency level of the transparent scrollbar when the duration of the touch event is less than a threshold duration of a touch and hold gesture;

highlighting the transparent scrollbar when the duration of the touch event is greater than or equal to the threshold duration of the touch and hold gesture; and causing the redisplay of the user interface screen without the transparent scrollbar when the touch event ends.

18. A portable electronic device, comprising:

a processor;

a touch-sensitive display having a touch-sensitive overlay coupled to the processor;

wherein the processor is configured for:

causing the display of a user interface screen having a scrollable area on the touch-sensitive display, the user interface screen having a transparent scrollbar which overlays elements of the scrollable area when a touch event is detected in a display area corresponding to the scrollable area;

detecting a touch event in a display area corresponding to the scrollable area;

determining a duration of the touch event;

causing a transparency level of the transparent scrollbar to be decreased from a default level when the duration of the touch event is less than a threshold duration of a touch and hold gesture;

highlighting the transparent scrollbar when the duration of the touch event is greater than or equal to the threshold duration of the touch and hold gesture; and causing the transparency level of the transparent scrollbar to be increased to the default level when the touch event ends.

19. The method of claim 1, wherein the transparency level of the transparent scrollbar is progressively decreased until the threshold duration is reached.

20. The method of claim 16, wherein the transparency level of the transparent scrollbar is progressively decreased until the threshold duration is reached.

* * * * *